United States Patent
Pappa et al.

(10) Patent No.: US 11,212,713 B2
(45) Date of Patent: Dec. 28, 2021

(54) SEAMLESS MOBILITY FOR ICN PRODUCERS

(71) Applicant: Telefonaktiebolaget LM Ericsson (publ), Stockholm (SE)

(72) Inventors: Ioanna Pappa, Stockholm (SE); Eric Andersson, Stockholm (SE); Jari Vikberg, Järna (SE)

(73) Assignee: Telefonaktiebolaget LM Ericsson (pubi), Stockholm (SE)

( * ) Notice: Subject to any disclaimer, the term of this patent is extended or adjusted under 35 U.S.C. 154(b) by 141 days.

(21) Appl. No.: 16/609,471

(22) PCT Filed: Jun. 9, 2017

(86) PCT No.: PCT/SE2017/050614
§ 371 (c)(1),
(2) Date: Oct. 30, 2019

(87) PCT Pub. No.: WO2018/226135
PCT Pub. Date: Dec. 13, 2018

(65) Prior Publication Data
US 2020/0205043 A1     Jun. 25, 2020

(51) Int. Cl.
*H04W 4/00*      (2018.01)
*H04W 36/00*     (2009.01)
(Continued)

(52) U.S. Cl.
CPC ......... *H04W 36/0033* (2013.01); *H04L 45/54* (2013.01); *H04W 40/36* (2013.01)

(58) Field of Classification Search
CPC . H04W 36/0033; H04W 40/36; H04W 92/20; H04W 40/00; H04L 45/54; H04L 67/327; H04L 45/64; H04L 45/38
(Continued)

(56) References Cited

U.S. PATENT DOCUMENTS 10,091,701 B1 * 10/2018 Sharma ............... H04L 45/54
11,051,355 B2 *  6/2021 Mildh ................ H04W 76/30
(Continued)

FOREIGN PATENT DOCUMENTS

EP     2869537 A1    5/2015
EP     3038327 A1    6/2016
(Continued)

*Primary Examiner* — Chuong T Ho
(74) *Attorney, Agent, or Firm* — Coats + Bennet, PLLC

(57) ABSTRACT

The invention relates to methods and devices of distributing data content in an Information Centric Networking (ICN) network where access of a wireless communication device publishing the data content is transferred from a source access point serving wireless communication device to a target access point. In an aspect of the invention, a method performed by a source access point (102) is provided for distributing data content in an ICN network (112) where access of a wireless communication device (103) publishing the data content is transferred from the source access point (102) serving the wireless communication device (103) to a target access point (104). The method comprises notifying (S101) the target access point (104) of an ICN routing identifier associated with the wireless communication device (103) providing the requested data content, notifying (S103) the target access point (104) of any pending ICN requests directed to the wireless communication device (103) such that that any data content provided by the wireless communication device (103) to the target access point (104) is forwarded to the original requester, and updating (S105) an ICN Forwarding Information Base, FIB, at the source access point (102) such that any ICN request directed to the wireless communication device (103) is forwarded to the target access point (104).

16 Claims, 5 Drawing Sheets

(51) Int. Cl.
*H04L 12/741* (2013.01)
*H04W 40/36* (2009.01)

(58) Field of Classification Search
USPC .......................................... 370/328, 329, 330
See application file for complete search history.

(56) References Cited

U.S. PATENT DOCUMENTS

| | | |
|---|---|---|
| 2013/0039249 A1* | 2/2013 | Ravindran .......... H04W 36/026 370/312 |
| 2014/0192717 A1 | 7/2014 | Liu et al. |
| 2017/0034055 A1* | 2/2017 | Ravindran ............ H04L 45/306 |
| 2017/0257802 A1* | 9/2017 | Roeland ............ H04W 36/0016 |
| 2017/0257904 A1* | 9/2017 | Mildh ................... H04W 76/20 |
| 2018/0103128 A1* | 4/2018 | Muscariello ............ H04L 69/22 |
| 2018/0145927 A1* | 5/2018 | Srikanteswara .... H04L 67/2876 |
| 2018/0241669 A1* | 8/2018 | Muscariello ............ H04L 63/10 |
| 2018/0241679 A1* | 8/2018 | Muscariello .......... H04L 67/327 |
| 2018/0242186 A1* | 8/2018 | Muscariello .......... H04L 67/327 |
| 2018/0242218 A1* | 8/2018 | Muscariello .......... H04W 80/00 |
| 2018/0343194 A1* | 11/2018 | Liu ........................ H04L 45/22 |
| 2020/0053187 A1* | 2/2020 | Roeland ............. H04L 67/2842 |
| 2021/0136647 A1* | 5/2021 | Pappa ................... H04W 36/30 |

FOREIGN PATENT DOCUMENTS

| | | |
|---|---|---|
| WO | 2006130959 A1 | 12/2006 |
| WO | 2013183967 A1 | 12/2013 |
| WO | 2016199095 A1 | 12/2016 |

* cited by examiner

SEAMLESS MOBILITY FOR ICN PRODUCERS

TECHNICAL FIELD

The invention relates to methods and devices of distributing data content in an Information Centric Networking (ICN) network where access of a wireless communication device publishing the data content is transferred from the source access point serving wireless communication device to a target access point.

BACKGROUND

Over recent years, Information Centric Networking (ICN) is gaining momentum as a future technology for 5th generation mobile networks ("5G") and other coming technologies for media distribution, device software upgrades and the Internet of Things (IoT).

Information Centric Networking is a new networking paradigm. Content Centric Networking and Named Data Networking (NDN) represent two approaches within the ICN paradigm. In the following, the term ICN will be used to encompass ICN, CCN and NDN technology.

ICN may be utilized for delivery of content to a wireless communications device, commonly referred to as a User Equipment (UE), over e.g. a 3rd Generation Partnership Project (3GPP) network, where the UE may be embodied in the form of a smart phone, tablet, laptop, a gaming console, etc., or a so called fixed wireless terminal (FWT) in the form of e.g. a television set, a computer, or a set top box, typically being wirelessly connected via WiFi.

In contrast to traditional Internet Protocols (IPs), ICN addresses content objects using globally or locally unique names instead of IP addresses. Hence, every content object in ICN has a globally or locally unique name and is routed through a communication system by means of the unique name instead of IP addresses.

FIG. 1 illustrates a general operating principle of prior art ICN content request and delivery. This operating principle assumes that a link used in one direction—e.g. between ICN Node 1 and ICN Node 2 essentially being switches equipped with large caches for transporting content—to send content requests from subscribers is also used in the other direction to send the corresponding content back via ICN Node 1 and ICN Node 2 from a content provider (i.e. a "publisher") to the subscribers. All links in ICN are therefore assumed to allow for bi-directional communication. A request in ICN terminology is commonly referred to as an "interest" and comprises the unique name of the content object to be fetched (commonly referred to as "data").

Multicast support is a key feature in ICN when transporting a particular content from a content provider to various subscribers/end users whom have requested content from that particular content provider. With reference to FIG. 1, if both Subscriber 1 and 2 request the same content, e.g. a live video stream, both subscribers will submit a request/interest to ICN Node 1. However, ICN Node 1 will only forward a single request to ICN Node 2 for that video stream, and ICN Node 2 will as a result forward the single request towards the content provider. This is referred to as "interest aggregation". The content provider will thereafter return a single copy of the requested live stream to ICN Node 2. Likewise, ICN Node 2 will only send one copy of the live stream over its link to ICN Node 1. ICN Node 1 will then replicate the content of the video stream and send it to both Subscriber 1 and 2.

To the contrary, should ICN node 1 already have the requested content in its cache, it will deliver the content to the requesting subscriber(s) without submitting any further upstream request to ICN Node 2.

The routing of interests is helped by the name of a requested piece of content being a structured name (similar to domain names, but with richer syntax). Routing ICN nodes maintain a Forwarding Information Base (FIB) indicating where, i.e. across which interface, the interest message including name or name prefix should be forwarded to.

The routing ICN nodes along the path of the travelling interest message keep a record of the interest messages they have forwarded (i.e. the interface(s) that the interest came from and the content object it was naming) in their Pending Interest Table (PIT), in order to be able to route content objects to the requester of the objects, commonly referred to as "breadcrumb routing".

Further, each ICN node comprises a Content Store (CS) shown as a content cache in FIG. 1, which is used to cache a copy of the named content objects. Future interests for the same object can then be served from the cache without forwarding the interest to further ICN node(s).

As can be concluded, when the interest message reaches an ICN node having a copy of the content object, the content object is propagated backwards along the path the interest message took. The backward path is learned from the entries the interest message left in the PITs of the ICN nodes along the path. If there were multiple interests arriving at an ICN node for a content object address by a particular name, the content object is replicated towards each respective interface/direction the interest messages came from. After forwarding a content object matching a pending interest, the ICN nodes delete the corresponding entry in the PIT. When the original endpoint(s) generating the interest message(s) receive the content object, the transaction is considered finalized.

As can be concluded, ICN technology provides for an efficient, scalable and flexible approach of delivering information to an end-user.

A problem with the existing ICN technology implemented in wireless communication networks as described hereinabove is that if a node who wishes to distribute content in the ICN network is mobile, e.g. being a UE 103, the distribution may fail. For instance, a "publishing" UE receiving an ICN interest may move to another access point before the requested piece of content is delivered back to the ICN network. If so, the requested piece of content cannot find its way back to the requester.

SUMMARY

An objective of the present invention is to solve, or at least mitigate, this problem in the art and to provide an improved method of handling handover of a wireless communication device publishing requested data content on an ICN network.

This object is attained in a first aspect of the invention by a method performed by a source access point of distributing data content in an ICN network where access of a wireless communication device publishing the data content is transferred from the source access point serving the wireless communication device to a target access point. The method comprises notifying the target access point of an ICN routing identifier associated with the wireless communication device providing the requested data content, notifying the target access point of any pending ICN requests directed to the wireless communication device, and updating an ICN FIB at the source access point such that any ICN request directed to the wireless communication device is forwarded to the target access point.

This object is attained in a second aspect of the invention by a method performed by a target access point of distributing data content in an ICN network where access of a wireless communication device publishing the data content is transferred from a source access point serving the wireless communication device to the target access point. The method comprising receiving, from the source access point, an ICN routing identifier associated with the wireless communication device providing the requested data content, updating an ICN FIB at the target access point such that any ICN request directed to the ICN routing identifier associated with the wireless communication device is forwarded to the wireless communication device, receiving, from the source access point, any pending ICN requests directed to the wireless communication device, and updating an ICN PIT at the target access point with the received pending ICN requests.

This object is attained in a third aspect of the invention by a source access point configured to distribute data content in an ICN network where access of a wireless communication device publishing the data content is transferred from the source access point serving the wireless communication device to a target access point. The source access point comprises a processing unit and a memory, which memory contains instructions executable by the processing unit, whereby said source access point is operative to notify the target access point of an ICN routing identifier associated with the wireless communication device providing the requested data content, notify the target access point of any pending ICN requests directed to the wireless communication device, and update an ICN FIB at the source access point such that any ICN request directed to the wireless communication device is forwarded to the target access point.

This object is attained in a fourth aspect of the invention by a target access point configured to distribute data content in an ICN network where access of a wireless communication device publishing the data content is transferred from a source access point serving the wireless communication device to the target access point. The target access point comprises a processing unit and a memory, which memory contains instructions executable by the processing unit, whereby the target access point is operative to receive, from the source access point, an ICN routing identifier associated with the wireless communication device providing the requested data content, update an ICN FIB at the target access point such that any ICN request directed to the ICN routing identifier associated with the wireless communication device is forwarded to the to the wireless communication device, receive, from the source access point, any pending ICN requests directed to the wireless communication device, and update an ICN PIT at the target access point with the received pending ICN requests.

Assuming that a plurality of content consumers have requested content from a wireless communication device, in the following being referred to as a User Equipment (UE), via a source access point currently serving the UE, in the following being referred to as a source eNodeB.

If at this stage there are pending ICN interests to the UE for content, and the UE is handed over from the source eNodeB to a target access point, in the following being referred to as a target eNodeB, the pending ICN interests handled by the source eNodeB will not be attended to, and will eventually be discarded by the source eNodeB. Further, if the UE makes an attempt to deliver any requested content to the target eNodeB, there is no corresponding PIT entry at the target eNodeB, and the content will be dropped.

In connection to the handover, the source eNodeB notifies the target eNodeB of an ICN routing identifier associated with the UE providing the requested data content. Hence, the name (commonly referred to as ICN name prefix) of the UE providing the requested data content is provided to the target eNodeB.

In an embodiment, the ICN routing identifier associated with the UE is submitted to the target eNodeB during handover preparation, and the UE ICN routing identifier is advantageously included in a new information element (IE) of a Handover Request.

In an alternative embodiment, the UE ICN routing identifier is transferred from the source eNodeB to the target eNodeB during handover execution. In this embodiment, the UE ICN routing identifier is submitted in a new X2 message, for instance by means of a new mobility procedure.

Thereafter, the target eNodeB updates its FIB with the received ICN routing identifier of the UE such that any ICN request intended for the UE indeed is forwarded to the UE.

Further, the source eNodeB notifies the target eNodeB of any pending ICN requests—ICN interests—intended for the UE. The pending ICN interests may be sent as regular ICN messages, and consequently the PIT in the target eNodeB is updated such that the target eNodeB is made aware of where—i.e. to which requesting node—it should send the data content provided by the UE for any pending ICN interests. It is noted that the delivery of the requested data content of the pending ICN interests to the requesting node(s) is undertaken via the source eNodeB.

The source eNodeB updates its FIB such that any received ICN interest directed to the UE is forwarded to the target eNodeB according to the updated FIB. Unacknowledged Packet Data Convergence Protocol (PDCP) Service Data Units (SDUs) and ICN data content intended for the UE is forwarded according to normal behaviour for lossless X2 handover.

In an embodiment, during handover completion, the target eNodeB will send a routing update to the ICN network informing any relevant ICN node(s) about the new location of the UE. Hence, the UE ICN routing identifier will be submitted to the relevant ICN node(s) in the ICN network for FIB update, such that any ICN interests intended for the UE from now on are sent via the target eNodeB.

Hence, any data forwarding from the source eNodeB will eventually cease. The announcing on the ICN network that the access of the UE has been transferred, i.e. that the handover is completed, to the target eNodeB may alternatively be undertaken by the source eNodeB.

Advantageously, the present invention provides for seamless producer mobility in ICN based on the 3GPP handover procedure, and procedures are added to ensure the provisioning to the target eNodeB of all ICN Interest messages related to the specific producer, in this particular example the UE.

In a further embodiment, when notifying the target eNodeB of any pending ICN requests directed to the UE, the source eNodeB retrieves the pending ICN requests from the PIT by matching the pending ICN requests to the ICN routing identifier associated with the UE and derives, from the PIT, any ICN request for which there is a match.

In yet an embodiment, the source eNodeB extends its PIT to comprise an ICN routing identifier for each ICN request listed therein. Thereafter, when notifying the target eNodeB of any pending ICN requests directed to the UE, the source eNodeB retrieves the pending ICN requests from the extended PIT by identifying all the pending ICN requests directed to the UE. Advantageously, this is a more swift approach than the matching process where typically each ICN request must be evaluated.

In a fifth aspect, a computer program is provided comprising computer-executable instructions for causing the source access point to perform the method of the first aspect when the computer-executable instructions are executed on a processing unit included in the source access point.

In a sixth aspect, a computer program product is provided comprising a computer readable medium having the computer program according to the fifth aspect embodied thereon.

In a seventh aspect, a computer program is provided comprising computer-executable instructions for causing the target access point to perform the method of the second aspect when the computer-executable instructions are executed on a processing unit included in the target access point.

In an eighth aspect, a computer program product is provided comprising a computer readable medium having the computer program according to the seventh aspect embodied thereon.

Further embodiments of the invention will be described in the detailed description.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
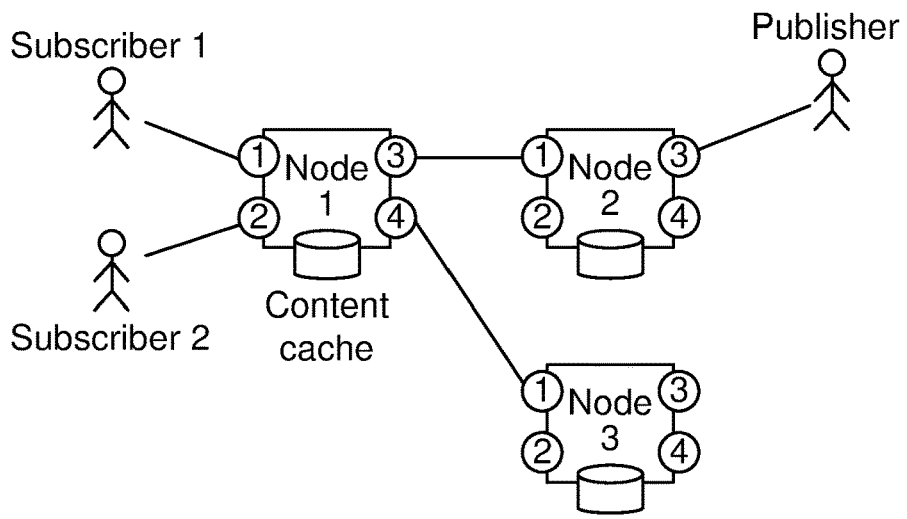
FIG. 1 illustrates a general operating principle of prior art ICN content delivery.

FIG. 1 shows an ICN-type network, the general principles of which previously have been discussed.

Figure 2:
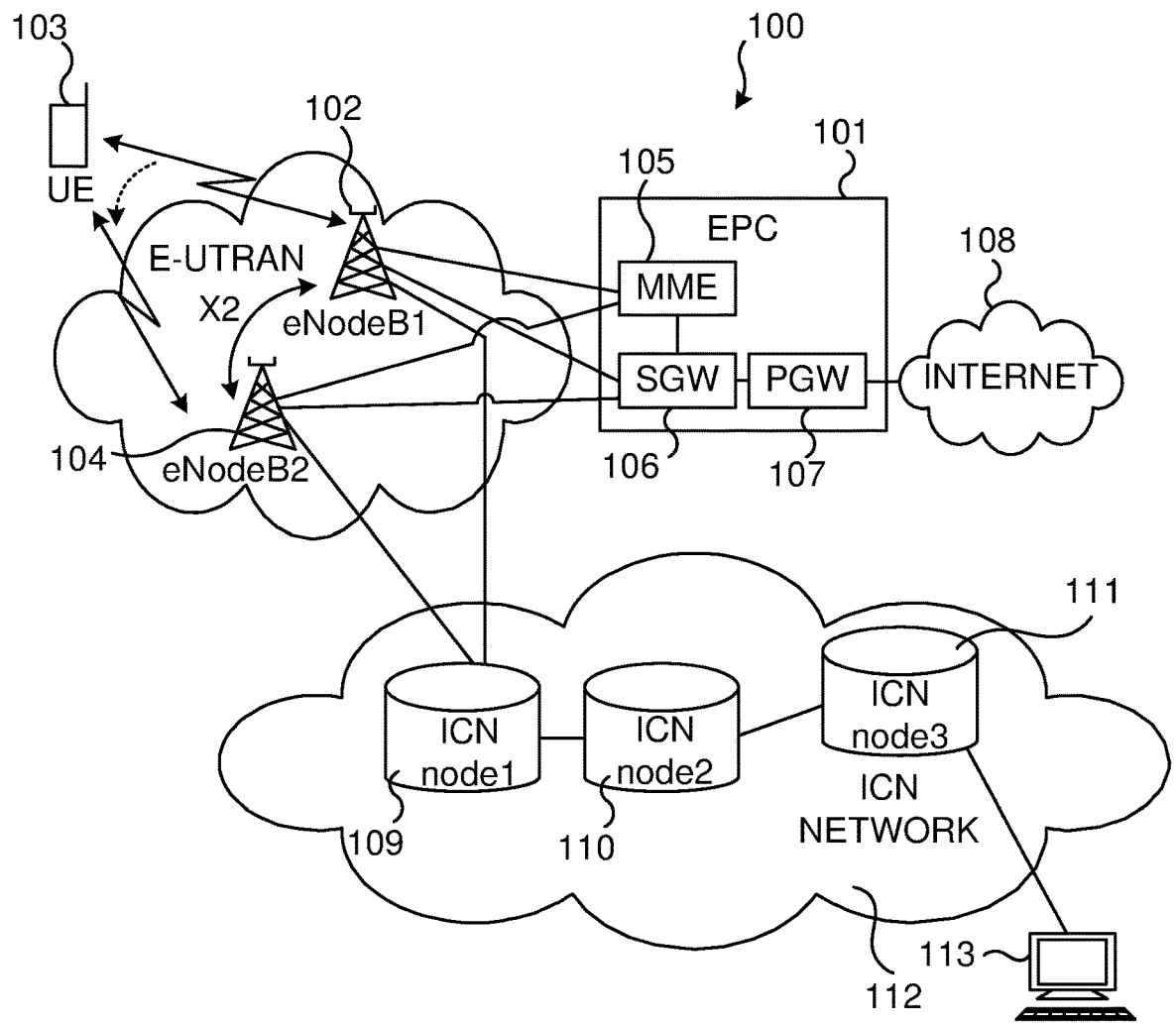
FIG. 2 shows a schematic overview of an exemplifying wireless communication system in which the present invention can be implemented.

FIG. 2 shows a schematic overview of an exemplifying wireless communication system in which the present invention can be implemented.

The wireless communication system 100 is a Long Term Evolution (LTE) based system, where the packet core network 101 is referred as an Evolved Packet Core (EPC) network, even though the invention may be implemented in any wireless system utilizing ICN technology, such as a 5th generation (5G) wireless system.

The wireless communication system 100 comprises a source radio base station 102 in the form of an eNodeB, which is part of the LTE radio access network referred to as Evolved Universal Terrestrial Radio Access Network (E-UTRAN), with which one or more wireless communication devices 103 (UEs) communicate. In practice, a number of eNodeBs together form the E-UTRAN. FIG. 2 further shows a target eNodeB 104 to which the access of the UE 103 is to be transferred, commonly referred to as a handover.

The eNodeBs 102, 104 are operatively connected to a Mobility Management Entity (MME) 105 for managing mobility of the UE 103 and to a Serving Gateway (SGW) 106 configured to route and forward user data packets, in turn operatively connected to an upstream Packet Data Network Gateway (PGW) 107, which provides connectivity from the UEs to external packet data networks 108, such as the Internet, by being the point of exit and entry of traffic for the UEs.

It should be noted that FIG. 2 is for illustrational purposes only, and that e.g. the EPC network 101 in practice is far more complex with a variety of functional nodes intercommunicating with each other.

FIG. 2 further illustrates a first ICN node 109, a second ICN node 110 and a third ICN node in forming an ICN network 112, where the first ICN node 109 connects downstream to the source eNodeB 102 and the target eNodeB 104 in the E-UTRAN. As previously mentioned, the ICN nodes are essentially switches or routers equipped with large caches for storing much-requested content for rapid delivery upon request. As is understood, any eNodeB 102, 104 as well as the UE wishing to engage in ICN communication must be equipped with ICN capability. Hence, the source eNodeB 102, the target eNodeB 104 and the UE are in that sense "ICN nodes" and are thus part of the ICN network 112.

Hence, requests (a.k.a. "interests") for content from the UE 103 will be sent to the source eNodeB 102, which in its turn will send an upstream request to the first ICN node 109 and if the requested content is not residing in its cache, the request will proceed upstream to the second ICN node 110, and so on.

Once the content has been encountered at one of the nodes, for example at the second ICN node no, the content will be delivered via the same bi-directional link in a downstream direction via the first ICN node 109 to the eNodeB 102, which in its turn transmits the requested content to a requesting UE or even broadcasts the requested content to a plurality of UEs requesting the same content, for instance in case a number of end-users are watching a live streaming sport event.

Conversely, the UE 103 itself may be a producer or "publisher" of content, in which case a consumer or "subscriber" of content, such as e.g. a computer 113 or another UE, via one or more of the ICN nodes 109-111 will make requests to the UE 103 via its serving eNodeB 102.

Thus, the structure of ICN advantageously allows for rapid delivery of requested content as compared to data request and delivery occurring over the core network 101.

However, as previously mentioned, if a node who wishes to publish content on the ICN network 112 is mobile, exemplified e.g. by the UE 103, problems may arise. For instance, a "publishing" UE 103 receiving an ICN interest may move to another eNodeB before the requested piece of content is delivered back to the ICN network. If so, the requested piece of content cannot find its way back to the requester(s) (i.e. the "subscribers", cf. FIG. 1).

Figure 3:
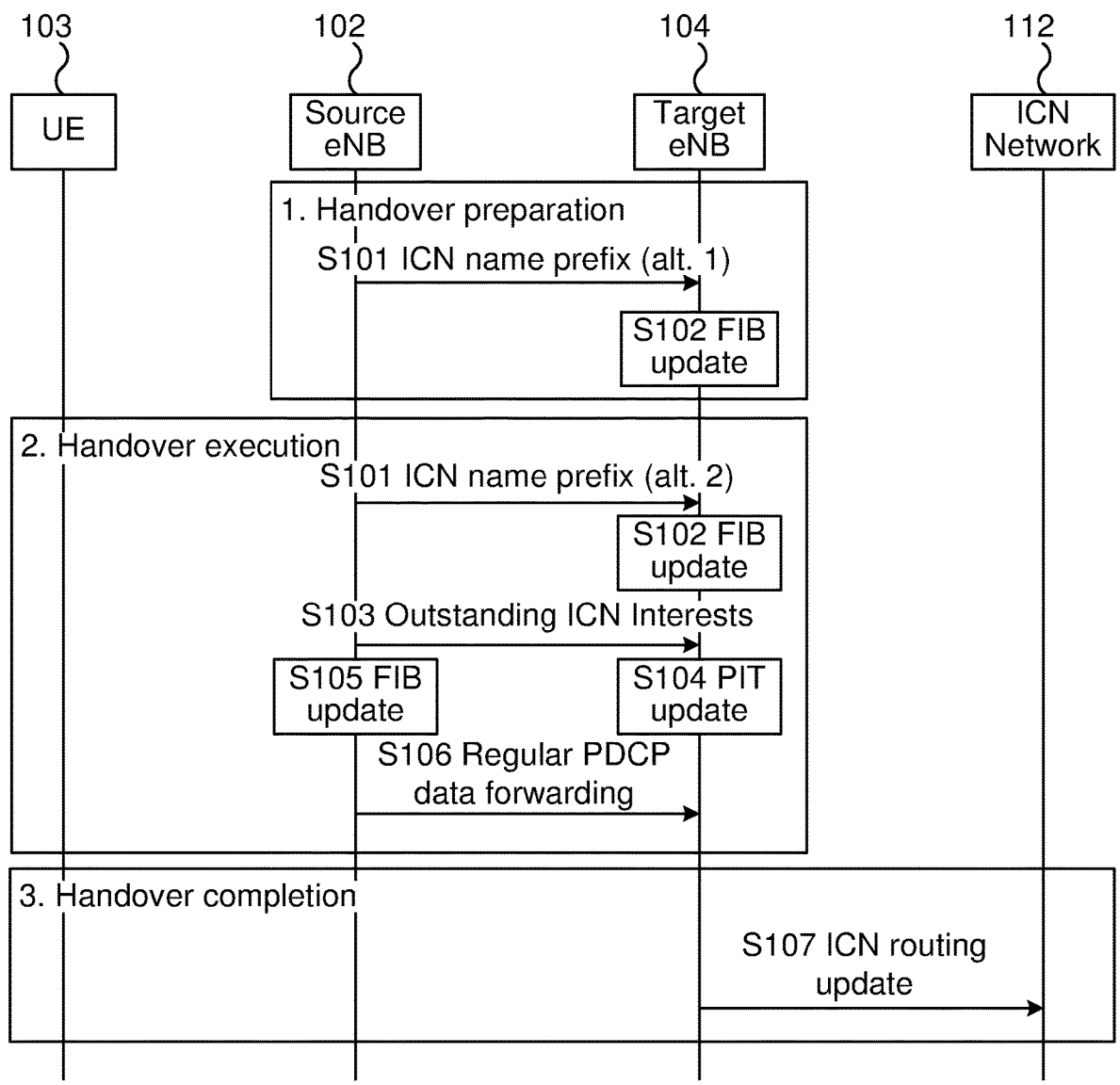
FIG. 3 shows a signalling diagram illustrating a method according to an embodiment of the invention.

FIG. 3 shows a signalling diagram illustrating a method according to an embodiment of the invention for overcoming this problem. Now, assuming that a plurality of content consumers have requested content from the UE 103 via the eNodeB currently serving the UE 103, i.e. the source eNodeB 102.

As previously has been discussed, an identifier of the UE 103 for which the ICN interest are intended must be entered in the FIB of the source eNodeB 102. In practice, the source eNodeB 102 may serve hundreds of UEs and consequently must keep track of ICN interests for data content directed to each UE that it serves.

In practice, the naming convention for identifying the UE 103 could look like "/ndn/telia/sweden/userid", where "ndn" indicates that the request relates to Named Data Networking, "telia" indicates the network operator, "sweden" indicates the country and "userid" pinpoints the particular UE 103. The naming could be extended to address a particular piece of content; "content1", the identifier could be extended to read "/ndn/telia/sweden/userid/content1". It is noted that this naming convention is an example only, and a variety of formats can be envisaged. The source eNodeB 102 must further register in its PIT where the interest came from in order to be able to route content back to the requester.

If at this stage there are pending ICN interests to the UE 103 for content, and the UE 103 is handed over from the source eNodeB 102 to the target eNodeB 104, the pending ICN interests handled by the source eNodeB 102 will not be attended to, and will eventually be discarded by the source eNodeB 102. Further, it the UE 103 makes an attempt to deliver any requested content to the target eNodeB 104, there is no corresponding PIT entry at the target eNodeB 104, and the content will be dropped.

It is noted that handover typically is effected by having the source eNodeB 102 and the target eNodeB 104 engage in communication over the so called X2 interface. The invention is described using the X2 interface-based handover as an example. The invention does however apply equally well for other handover variants, such as an S1 interface-based handover. It is envisaged that a corresponding X2 ICN interface is introduced for any ICN-related communication. This can be realized in different ways, e.g. using a GPRS ("General Packet Radio Service") Tunneling Protocol (GTP) over a user plane part of the X2 interface, or using a control plane part of the X2 interface, e.g. based on X2 Application Protocol (X2AP), or by introducing a separate ICN interface.

With reference to FIG. 3, the source eNodeB 102 makes a handover decision based on UE measurement reports and Radio Resource Management (RRM) information and sends an X2AP Handover Request message to the target eNodeB 104 to trigger handover preparation. If the target eNodeB 104 accepts the handover requests, it responds with an X2AP Handover Request Acknowledge message.

At this point (or later), the source eNodeB 102 notifies in step S101 the target eNodeB 104 of an ICN routing identifier associated with the UE 103 providing the requested data content. Hence, the name (commonly referred to as ICN name prefix) of the UE 103 providing the requested data content is provided to the target eNodeB 104, hereinabove exemplified by "/ndn/telia/sweden/userid", where "userid" uniquely identifies the UE 103.

In this embodiment, where the ICN routing identifier associated with the UE 103 is submitted to the target eNodeB 104 during handover preparation, the UE ICN routing identifier could advantageously be included in a new information element (IE) of the X2AP Handover Request message.

In step S102, the target eNodeB updates its FIB with the received ICN routing identifier of the UE 103 such that any ICN request intended for the UE 103 indeed is forwarded to the UE 103.

In an alternative embodiment, the UE ICN routing identifier is transferred from the source eNodeB 102 to the target eNodeB 104 in step S101 during handover execution. In this embodiment, the UE ICN routing identifier may be submitted in a new X2 message, for instance by means of a new mobility procedure. The target eNodeB 104 updates its FIB accordingly in step S102.

Thereafter, in step S103, the source eNodeB 102 notifies the target eNodeB 104 of any pending ICN requests—ICN interests—intended for the UE 103. The pending ICN interests can be sent in step S103 as regular ICN messages, and consequently the PIT in the target eNodeB 104 is updated in step S104 such that the target eNodeB 104 is made aware of where—i.e. to which requesting node—it should send the data content provided by the UE 103 for any pending ICN interests. It is noted that the delivery of the requested data content of the pending ICN interests to the requesting node(s) is undertaken via the source eNodeB 102.

Advantageously, in this embodiment, the pending ICN interest messages are sent as regular ICN messages in step S103. Hence, there is no need to introduce any new message format. It is noted that this can result in the UE 103 receiving duplicate ICN interest(s).

Further, in step S105, the FIB is updated at the source eNodeB 102 such that any received ICN interest directed to the UE 103 is forwarded to the target eNodeB 104.

In step S106, unacknowledged Packet Data Convergence Protocol (PDCP) SDU's and ICN data content intended for the UE 103 is forwarded by the source eNodeB 102 to the target eNodeB 104 according to normal behaviour for lossless X2 handover. Finally, in step S107, during handover completion, the target eNodeB 104 will send a routing update to the ICN network 112 informing the next preceding upstream ICN node 109 about the new location of the UE 103. Hence, the UE ICN routing identifier will be submitted to the relevant ICN node 109 in the ICN network 112, which will update its FIB accordingly such that any ICN interests intended for the UE 103 from now on are sent via the target eNodeB 104. Hence, any data forwarding from the source eNodeB 102 will eventually cease. The announcing on the ICN network 112 that the access of the UE 103 has been transferred, i.e. that the handover is completed, to the target eNodeB 104 may alternatively be undertaken by the source eNodeB 102. Advantageously, the embodiments described with reference to FIG. 3 provides for seamless producer mobility in ICN based on the 3GPP handover procedure, and procedures are added to ensure the provisioning to the target eNodeB 104 of all ICN Interest messages related to the specific producer, in this particular example the UE 103.

In an embodiment, with reference again to step S103 where the source eNodeB 102 notifies the target eNodeB 104 of any pending ICN interests intended for the UE 103, the source eNodeB 102 searches the PIT for the ICN routing identifier associated with the UE 103, retrieves the ICN routing identifier and forwards any pending interests for which there is a match with the ICN routing identifier to the target eNodeB 104. The ICN requests for the UE 103 are also kept in the PIT of the source eNodeB 102.

In an alternative embodiment, the source eNodeB 102 (and the target eNodeB 104 in its turn for facilitating any future handovers) extends its PIT, for each ICN interest listed therein, with the ICN routing identifier which designates the intended recipient of the submitted ICN request. Any pending ICN requests may thus be retrieved from the extended PIT by identifying all the pending ICN requests directed to the UE 103.

Figure 4A:
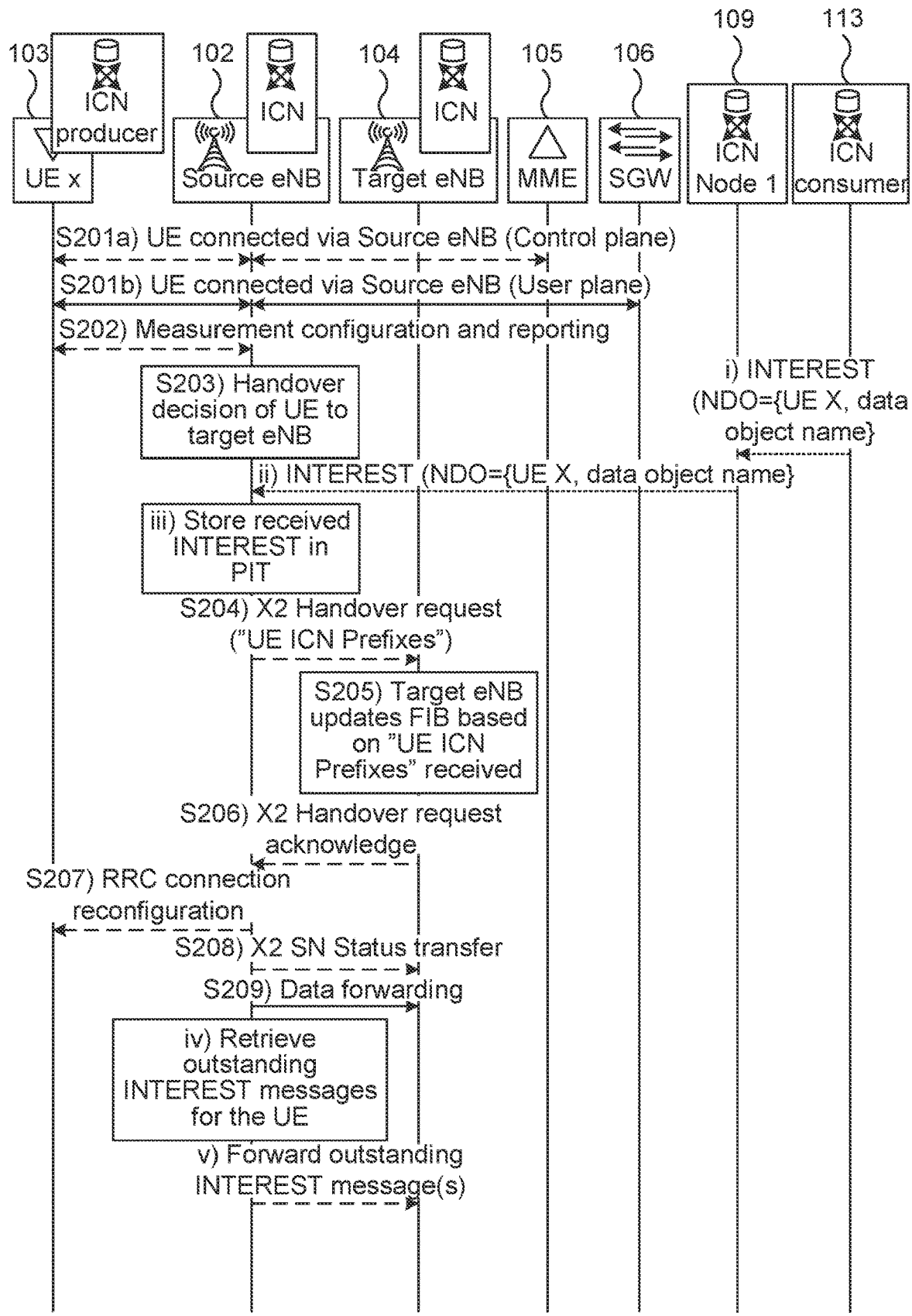
FIGS. 4A-4B show a signalling diagram which in more detail illustrates a method according to an embodiment of the invention.
Figure 4B:
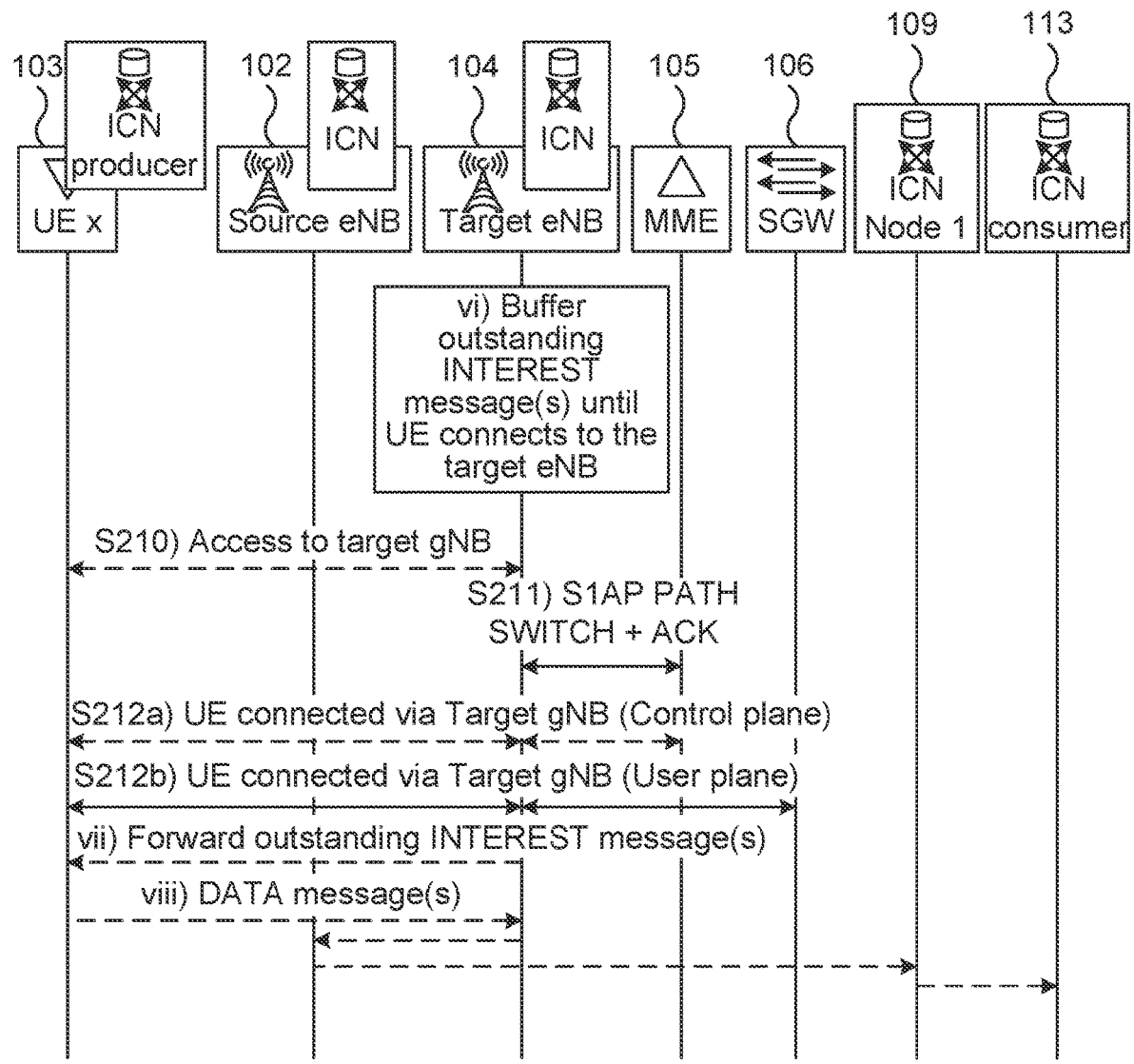

FIGS. 4A-4B show a signalling diagram illustrating a method according to an additional embodiment of the invention for performing the handover as previously described with reference to FIG. 3. FIGS. 4A-4B show the alternative in which the ICN routing identifier associated with the UE 103 is submitted to the target eNodeB 104 during handover preparation.

In FIGS. 4A-4B, steps S201-S212 show mainly the signalling related to the 3GPP handover procedure, while steps i)-viii) show mainly ICN related signalling and actions. The relation and order between 3GPP handover and ICN related signalling is exemplifying only and steps can take place in a different order.

Step S201a illustrates the UE 103 connecting in the control plane to the MME 105 via the source eNodeB 102, while S201b illustrates the UE 103 connecting in the user plane to the SGW 106 via the source eNodeB 102.

In step S202, the UE 103 performs measurements on e.g. signal quality such as Reference Signals Received Power (RSRP) and reports to the source eNodeB 102, and based on the report the source eNodeB 102 determines in step S203 whether to perform a handover or not.

In step i), the ICN consumer 113 submits an ICN interest comprising an identifier of the requested data content and a UE ICN routing identifier, i.e. an identifier designating the provider of the requested ICN content, via the ICN network 112 (in this signalling diagram exemplified by the ICN node 109).

The ICN node 109 in its turn forwards the ICN interest in step ii) to the base station serving the UE 103, i.e. to the source eNodeB 102, based on the current FIB in the ICN node 109. The source eNodeB 102 stores the received ICN interest in its PIT in step iii).

Thereafter, the source eNodeB 102 sends an X2AP Handover Request message to the target eNodeB 104 in step S204, wherein the ICN routing identifier associated with the UE 103 is submitted to the target eNodeB 104 (this corresponds to step S101 of FIG. 3). The target eNodeB 104 updates its FIB accordingly with the UE ICN routing identifier in step S205 and submits an acknowledgment to the source eNodeB 102 in step S206.

The source eNodeB 102 submits an RRC Connection Reconfiguration message to the UE 103 in step S207 to notify the UE 102 that the RRC connection is to be modified due to the handover, and further submits an SN Status Transfer message to the target eNodeB 104 in step S208 and forwards any relevant data in step S209.

In steps iv) and v), any pending ICN interests for the UE 103 are retrieved at the source eNodeB 102 and forwarded to target eNodeB 104, wherein the target eNodeB 104 updates its PIT accordingly in step vi). The ICN requests for the UE 103 are also kept in the PIT of the source eNodeB 102.

Step S210 illustrates that the UE 103 hands over from the source eNodeB 102 to the target eNodeB 104, and in step S211 the target eNodeB 104 submits an S1AP Path Switch message to the MME 105 indicating that the target eNodeB 104 requests switching of the S1-U GTP tunnel towards the target eNodeB 104.

Step S212a illustrates that the UE 103 is connected in the control plane to the MME 105 via the target eNodeB 104, while S212b illustrates that the UE 103 is connected in the user plane to the SGW 106 via the target eNodeB 104.

In step vii), any outstanding ICN interests not yet delivered to the UE 103 is forwarded to the UE 103 by the target eNodeB 104.

Finally, in step viii) the UE 103 sends the requested data to the target eNodeB 104, which in accordance with its updated PIT forwards the requested data to the source eNodeB 102 which in its turn submits the requested data via the ICN node 109 in the ICN network 112 to the ICN consumer 113.

Figure 5:
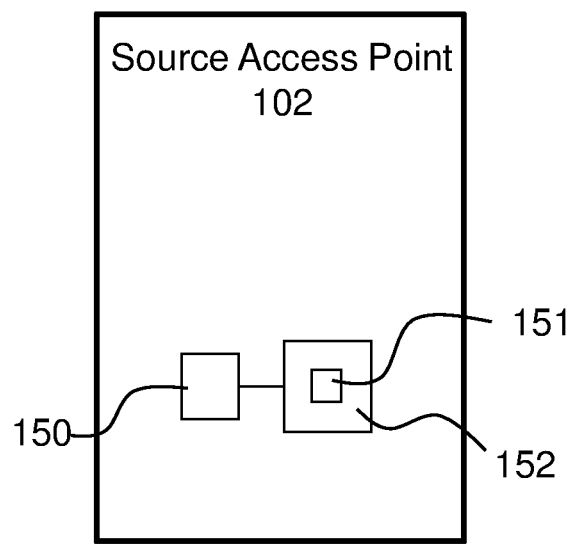
FIG. 5 illustrates a source access point according to an embodiment.
Figure 6:
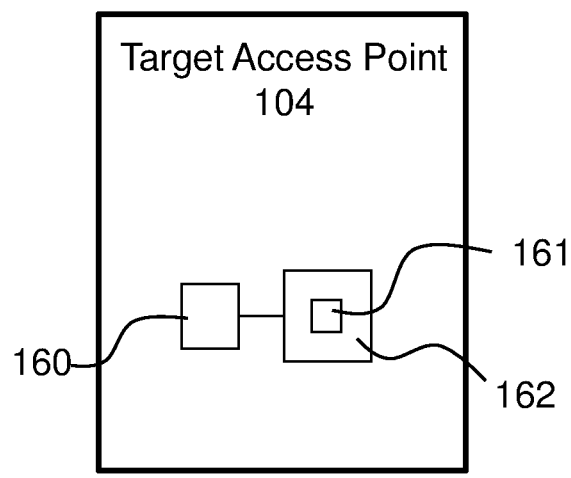
FIG. 6 illustrates a target access point according to an embodiment.

With reference to FIGS. 5 and 6, the steps of the method performed by the source access point 102 and the target access point 104, respectively, according to embodiments are in practice performed by a processing unit 150, 160 embodied in the form of one or more microprocessors arranged to execute a computer program 151, 161 downloaded to a suitable storage medium 152, 162 associated with the microprocessor, such as a Random Access Memory (RAM), a Flash memory or a hard disk drive. The respective processing unit 150, 160 is arranged to cause the source access point 102 and the target access point 104 to carry out the method according to embodiments when the appropriate computer program 150, 160 comprising computer-executable instructions is downloaded to the storage medium 152, 162 and executed by the processing unit 150, 160. The storage medium 152, 162 may also be a computer program product comprising the computer program 151, 161. Alternatively, the computer program 151, 161 may be transferred to the storage medium 152, 162 by means of a suitable computer program product, such as a Digital Versatile Disc (DVD) or a memory stick.

As a further alternative, the computer program 151, 161 may be downloaded to the storage medium 152, 162 over a network. The processing unit 150, 160 may alternatively be embodied in the form of a digital signal processor (DSP), an application specific integrated circuit (ASIC), a field-programmable gate array (FPGA), a complex programmable logic device (CPLD), etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method, performed by a source access point, of distributing data content in an Information Centric Networking (ICN) network where access of a wireless communication device publishing the data content is transferred from the source access point serving the wireless communication device to a target access point, the method comprising the source access point:
notifying the target access point of an ICN routing identifier associated with the wireless communication device providing requested data content;

notifying the target access point of any pending ICN requests directed to the wireless communication device; and updating an ICN Forwarding Information Base (FIB) at the source access point such that any ICN request directed to the wireless communication device is forwarded to the target access point.

2. The method of claim 1, wherein the notifying the target access point of any pending ICN requests directed to the wireless communication device comprises:

retrieving the pending ICN requests from an ICN Pending Interest Table (PIT) of the source access point by matching the pending ICN requests to the ICN routing identifier associated with the wireless communication device.

3. The method of claim 2:

further comprising extending the PIT to comprise an ICN routing identifier for each ICN request listed therein;

wherein the notifying the target access point of any pending ICN requests directed to the wireless communication device comprises retrieving the pending ICN requests from the extended PIT by identifying all the pending ICN requests directed to the wireless communication device.

4. The method of claim 1, further comprising announcing, on the ICN network, that the access of the wireless communication device has been transferred to the target access point in order to trigger FIB updates in the ICN network.

5. The method of claim 1, wherein the notifying the target access point of the ICN routing identifier comprises submitting the ICN routing identifier associated with the wireless communication device providing the requested data content as an Information Element (IE) in an X2 Application Protocol Handover Request.

6. The method of claim 1, wherein the notifying the target access point of the ICN routing identifier comprises submitting the ICN routing identifier associated with the wireless communication device providing the requested data content in a specific X2 message created for carrying the ICN routing identifier.

7. The method of claim 1, wherein the notifying the target access point of any pending ICN requests comprises submitting the pending ICN interests as regular ICN messages.

8. A method, performed by a target access point, of distributing data content in an Information Centric Networking (ICN) network where access of a wireless communication device publishing the data content is transferred from a source access point serving the wireless communication device to the target access point, the method comprising the target access point:

receiving, from the source access point, an ICN routing identifier associated with the wireless communication device providing requested data content;

updating an ICN Forwarding Information Base (FIB) at the target access point such that any ICN request directed to the ICN routing identifier associated with the wireless communication device is forwarded to the wireless communication device;

receiving, from the source access point, any pending ICN requests directed to the wireless communication device; and updating an ICN Pending Interest Table (PIT) at the target access point with the received pending ICN requests.

9. A source access point configured to distribute data content in an Information Centric Networking (ICN) network where access of a wireless communication device publishing the data content is transferred from the source access point serving the wireless communication device to a target access point, the source access point comprising:

processing circuitry;

memory containing instructions executable by the processing circuitry whereby the source access point is operative to:

notify the target access point of an ICN routing identifier associated with the wireless communication device providing requested data content;

notify the target access point of any pending ICN requests directed to the wireless communication device; and update an ICN Forwarding Information Base (FIB) at the source access point such that any ICN request directed to the wireless communication device is forwarded to the target access point.

10. The source access point of claim 9, wherein the instructions are such that the source access point is operative to, when notifying the target access point of any pending ICN requests directed to the wireless communication device, retrieve the pending ICN requests from an ICN Pending Interest Table (PIT) of the source access point by matching the pending ICN requests to the ICN routing identifier associated with the wireless communication device.

11. The source access point of claim 10, wherein the instructions are such that the source access point is operative to:

extend the PIT to comprise an ICN routing identifier for each ICN request listed therein; and further to, when notifying the target access point of any pending ICN requests directed to the wireless communication device:

retrieve the pending ICN requests from the extended PIT by identifying all the pending ICN requests directed to the wireless communication device.

12. The source access point of claim 9, wherein the instructions are such that the source access point is operative to announce, on the ICN network, that the access of the wireless communication device has been transferred to the target access point in order to trigger FIB updates in the ICN network.

13. The source access point of claim 9, wherein the instructions are such that the source access point is operative to, when notifying the target access point of the ICN routing identifier, submit the ICN routing identifier associated with the wireless communication device providing the requested data content as an Information Element (IE) in an X2 Application Protocol Handover Request.

14. The source access point of claim 9, wherein the instructions are such that the source access point is operative to, when notifying the target access point of the ICN routing identifier, submit the ICN routing identifier associated with the wireless communication device providing the requested data content in a specific X2 message created for carrying the ICN routing identifier.

15. The source access point of claim 9, wherein the instructions are such that the source access point is operative to, when notifying the target access point of any pending ICN requests, submit the pending ICN interests as regular ICN messages.

16. A target access point configured to distribute data content in an Information Centric Networking (ICN) network where access of a wireless communication device publishing the data content is transferred from a source access point serving wireless communication device to the target access point, the target access point comprising:

processing circuitry;

memory containing instructions executable by the processing circuitry whereby the target access point is operative to:

receive, from the source access point, an ICN routing identifier associated with the wireless communication device providing requested data content;

update an ICN Forwarding Information Base (FIB) at the target access point such that any ICN request directed to the ICN routing identifier associated with the wireless communication device is forwarded to the to the wireless communication device;

receive, from the source access point, any pending ICN requests directed to the wireless communication device; and update an ICN Pending Interest Table (PIT) at the target access point with the received pending ICN requests.

* * * * *